(12) United States Patent
Lawrence

(10) Patent No.: US 9,637,136 B2
(45) Date of Patent: May 2, 2017

(54) SUSPENDED COACH TRANSIT SYSTEM

(71) Applicant: Swift Tram, Inc., Boulder, CO (US)

(72) Inventor: Carl Eugene Lawrence, Boulder, CO (US)

(73) Assignee: Swift Tram, Inc., Boulder, CO (US)

( * ) Notice: Subject to any disclaimer, the term of this patent is extended or adjusted under 35 U.S.C. 154(b) by 273 days.

(21) Appl. No.: 14/079,543

(22) Filed: Nov. 13, 2013

(65) Prior Publication Data

US 2014/0130704 A1 May 15, 2014

Related U.S. Application Data

(60) Provisional application No. 61/726,281, filed on Nov. 14, 2012, provisional application No. 61/736,263, filed on Dec. 12, 2012.

(51) Int. Cl.
*B61B 3/02* (2006.01)

(52) U.S. Cl.
CPC ............... *B61B 3/02* (2013.01); *Y02T 30/30* (2013.01); *Y02T 30/40* (2013.01)

(58) Field of Classification Search
CPC ... B61B 3/00; B61B 3/02; Y02T 30/10; Y02T 30/12; Y02T 30/16; Y02T 30/32
USPC ........................... 104/89, 91, 94, 95; 105/8.1
See application file for complete search history.

(56) References Cited

U.S. PATENT DOCUMENTS

| 4,723,628 | A |   | 2/1988  | Fisher                |
| 5,209,435 | A | * | 5/1993  | Edwards ... B61B 12/005 |
|           |   |   |         | 105/348               |
| 5,251,816 | A |   | 10/1993 | Kalt et al.           |
| 5,797,330 | A |   | 8/1998  | Li                    |
| 6,688,235 | B2|   | 2/2004  | Rajaram               |
| 7,624,684 | B2|   | 12/2009 | Morris                |
| 7,963,229 | B2|   | 6/2011  | Timan                 |
| 8,077,100 | B2|   | 12/2011 | Baranski              |
| 8,375,865 | B2|   | 2/2013  | Zayas                 |
| 2003/0047106 | A1| * | 3/2003 | Rajaram ... B61B 3/02 |
|           |   |   |         | 104/89                |
| 2009/0032350 | A1| * | 2/2009 | Shapery ... B60L 5/005 |
|           |   |   |         | 191/10                |

(Continued)

FOREIGN PATENT DOCUMENTS

| JP | 05058276 A | * | 3/1993 |
| JP | 07172297 A | * | 7/1995 |

(Continued)

OTHER PUBLICATIONS

International Search Report and Written Opinion for PCT/US2013/070187, Date of Mailing Mar. 5, 2014, 15 pages.

(Continued)

*Primary Examiner* — Zachary Kuhfuss
(74) *Attorney, Agent, or Firm* — Robert G. Crouch; March Fischmann & Breyfogle LLP

(57) ABSTRACT

A suspended coach transit system comprising suspended coaches incorporating self-contained emergency evacuation means, dynamically balanced sway control for passenger comfort, system-wide communications for autonomous movement, radiant passenger heating and cooling and aerodynamic drag reduction for maximization of energy efficiency which serve to make the related products more comfortable, faster, safer and more energy efficient.

6 Claims, 2 Drawing Sheets

(56) References Cited

U.S. PATENT DOCUMENTS

| | | | |
|---|---|---|---|
| 2010/0085261 A1* | 4/2010 | Baranski | B32B 17/10018 343/713 |
| 2010/0282122 A1 | 11/2010 | Mai | |
| 2012/0055367 A1* | 3/2012 | Zayas | B61B 3/00 104/88.01 |
| 2013/0125778 A1* | 5/2013 | LaCabe | B61B 13/00 104/130.01 |

FOREIGN PATENT DOCUMENTS

| | | |
|---|---|---|
| JP | 2000296773 A | 10/2000 |
| JP | 2005058276 A | 3/2005 |
| JP | 2006335298 A | 12/2006 |
| JP | 2007165079 A | 6/2007 |
| JP | 2007172297 A | 7/2007 |
| WO | 2009059362 A1 | 5/2009 |

OTHER PUBLICATIONS

International Search Report and Written Opinion for PCT/US2013/070181, Date of Mailing Feb. 18, 2014, 17 pages.

\* cited by examiner

SUSPENDED COACH TRANSIT SYSTEM

CROSS REFERENCE TO RELATED PATENT APPLICATIONS

The present invention is related to, and claims priority to U.S. Provisional Patent Application Nos. 61/726,281 filed Nov. 14, 2012 and 61/736,263 filed Dec. 12, 2012, the disclosures of which are herein specifically incorporated by this reference in their entirety. The present invention is further related to the subject matter of U.S. patent application Ser. No. 14/079,531, for "Suspended Coach Drive Bogie" filed on Nov. 13, 2013, and assigned to the assignee of the present invention, the disclosure of which is herein specifically incorporated by this reference in its entirety.

BACKGROUND OF THE INVENTION

The present invention relates, in general, to the field of suspended monorails, also known as hanging trains or suspended coaches.

Hanging trains are used to carry passengers, and in some cases, freight. They utilize a fixed guide way from which passenger coaches or containers are suspended. There is most commonly an electric motor powering a bogie, which incorporates drive wheels that are used to propel the coaches along the guide way. The motors and wheels are integrated into the bogies, which travel along with the coaches. The electricity used to power the motors and wheels is generally made available to the motors through a system of bus-bars and shoes or brushes. In systems from the late nineteenth and early twentieth centuries, the drive wheels and electric motors were exposed to the weather, and the drive wheels rode on a single iron rail. In later systems, the bogies were enclosed within the guide ways, with the wheels driving on a set of internal guide way tracks.

The earliest operating suspended monorail that is still in service today was designed by Carl Eugen Langen for use in Wuppertal, Germany (1901). This German system utilized a single rail, similar to those found on conventional rail lines, and a set of wheels that ride on the single overhead rail. The passenger coaches hang, balanced directly beneath the overhead rail. A set of electric motors is connected to the wheels to propel the vehicles. This system currently carries about 75,000 riders per day on a dual-track, bidirectional route up and down the Wuppertal valley.

During the mid-twentieth century, a new approach was developed in which the bogies are concealed within a fixed guide way structure. The guide way is a rectilinear, hollow structural member incorporating a continuous slot opening in the bottom side. The electrically-powered bogies are completely contained within the guide way, except for a hinge affixed to the bogies aligned with, and accessible through, the slot in the bottom of the guide way. Passenger coaches are fastened to the hinges, thus allowing the coaches to swing in response to gravity and centrifugal forces acting on the coaches as the coaches travel around curved portions of the guide way. The bogies ride on two rails, or tracks: one on each side of the slot in the guide way structure.

For these systems, electrical bus-bars and connecting electrical shoes carry electrical power to the bogies. Motors use the electrical power to propel the coaches, and to provide lighting and door actuation on board the coaches.

SUMMARY OF THE INVENTION

Hanging trains, or suspended monorails, have been in service for more than a century. This mode of transit offers smoother and safer passenger service than any of the well-known, grade level modes. The hanging of the passenger coach allows it to swing while rounding a curve, thus keeping the passengers in equilibrium. Because the coaches are elevated above grade, there is little chance of their colliding with pedestrians or other vehicles, and thus the system can operate automatically as an automated people mover or autonomously when required.

In comparison to previous generations of the technology, the present invention advantageously provides technical improvements to the coaches, which are hung from electrically powered bogies; the guide way, which houses the bogies; the bogies themselves; and system controls. The present invention provides several enhancements to the conventional systems including junction switching, higher speeds, reserved energy storage for emergency operations and for assistance with meeting peak grid electrical load demand, cooperative computing among multiple bogies and self-diagnostics of the overall system. The inventions disclosed herein render the related products more reliable, faster, safer, and more energy efficient.

In particular, the inventions disclosed herein are applicable to the coaches, bogies, control schemes, scheduling schemes, guide ways, communications, product development process, cyber security and electrical power management. The bogies are fastened to the passenger coaches through a hinge aligned with, and passing through, a slot in the bottom of the guide way.

Although the designation of "suspended monorail" is not entirely accurate since there are actually two rails within the guide way, the name tends to be used synonymously with "hanging train" and "suspended train". In the earlier incarnations of this mode of transit, there was generally more than a single coach, and thus the reference to "train" would be appropriate. As for the inventions disclosed herein, only single coaches are disclosed and illustrated for the sake of clarity, and thus they do not qualify as "trains". Thus, for the sake of accuracy, the designation of "suspended coach" will be used throughout the specification. In this regard, the disclosed automated suspended coach is included in the automated people mover industry, yet will have a higher top speed than other members of this industry.

The inventions disclosed in the present application cover several items related to modern suspended coach automated people mover (APM) systems. In general, the bogie is electrically powered and drives on four or more wheels. The bogie incorporates an embedded digital processing unit and a means of storing energy. Although the bogies' primary purpose is to carry coaches, they can also operate without the attachment of a coach or any other device. The coaches generally have doors on one or both sides for boarding and un-boarding of the passengers.

In all known conventional systems, each coach was carried by two bogies. The present invention allows for the provision of a large coach which may be carried by two bogies and a smaller coach which may be carried by a single bogie.

Conventional systems have usually relied on local emergency response equipment such as fire department ladder trucks to effect any emergency evacuation of passengers from a stranded coach. The present invention advantageously discloses a governed release cable system to lower the coaches to the ground in case of an emergency evacuation. Alternatively, in some installations an inflatable slide can be used for mass passenger evacuation, similar to that used on airliners.

A major, as-yet unexploited, benefit of suspended trains or coaches is the ability to radically vary the speed of the coaches throughout the guide way system. Since the coaches swing as a result of gravity and centrifugal forces as a coach rounds a curve, comfort is maintained for the riders. As the comfort is always maintained, the coaches can run at any velocity in order to achieve an essentially perfect on-time arrival schedule. The present invention can also serve to benefit the system operator especially as the systems are built out into ever-expanding metropolitan networks.

To facilitate this "roll" feature in the coaches, the hinges will not only need to allow the coaches to swing to the outside of a curve, but also be able to allow the coach to swing when two bogies on a large coach are not aligned, as in rounding a curved section of track at a non-designed-for speed. When the bank angle of the guide way does not match the bank angle, or swing, of the coach, and the guide way is curved, then the hinge must accommodate the non-alignment of the bogies and the swing simultaneously.

Although the design of lower speed coaches has not incorporated much in the way of advanced aerodynamics, the current invention advantageously implements drag-reducing enhancements to lower the overall energy consumption and the overall noise. Along with reducing drag on the coaches, the aft end of the coach may also incorporate a rudder to counteract sway created by the coach encountering high side winds. Other mechanical aerodynamic control surfaces can also be used, such as pop-out air-brakes on the sides of the coaches, and servo controlled aerodynamic surfaces on the bottom of the coaches.

To enhance passenger and system safety, the coaches may also be fabricated with fire proof and/or self-extinguishing materials. Heating and cooling energy demands may be reduced with the incorporation of auto-shading windows and radiant panel heating and cooling. Since there is no fueled engine on the coaches, there is no massive amount of waste heat for passenger comfort. The mechanical components used for heating, ventilation and air conditioning are carried in the end sections of the coaches, and if necessary this HVAC mechanical compartment can be flooded with a fire retardant or safely ejected from the coach as the case may be in case of fire.

Additional improvements disclosed herein include coach-to-coach and coach-to-command center communications, which may use any of the standard protocols such as IEEE 802, Zigbee or other communication technologies. This communications network can also be used for the coaches and bogies to operate autonomously in cases of control center failures.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A REPRESENTATIVE EMBODIMENT

Figure 1:
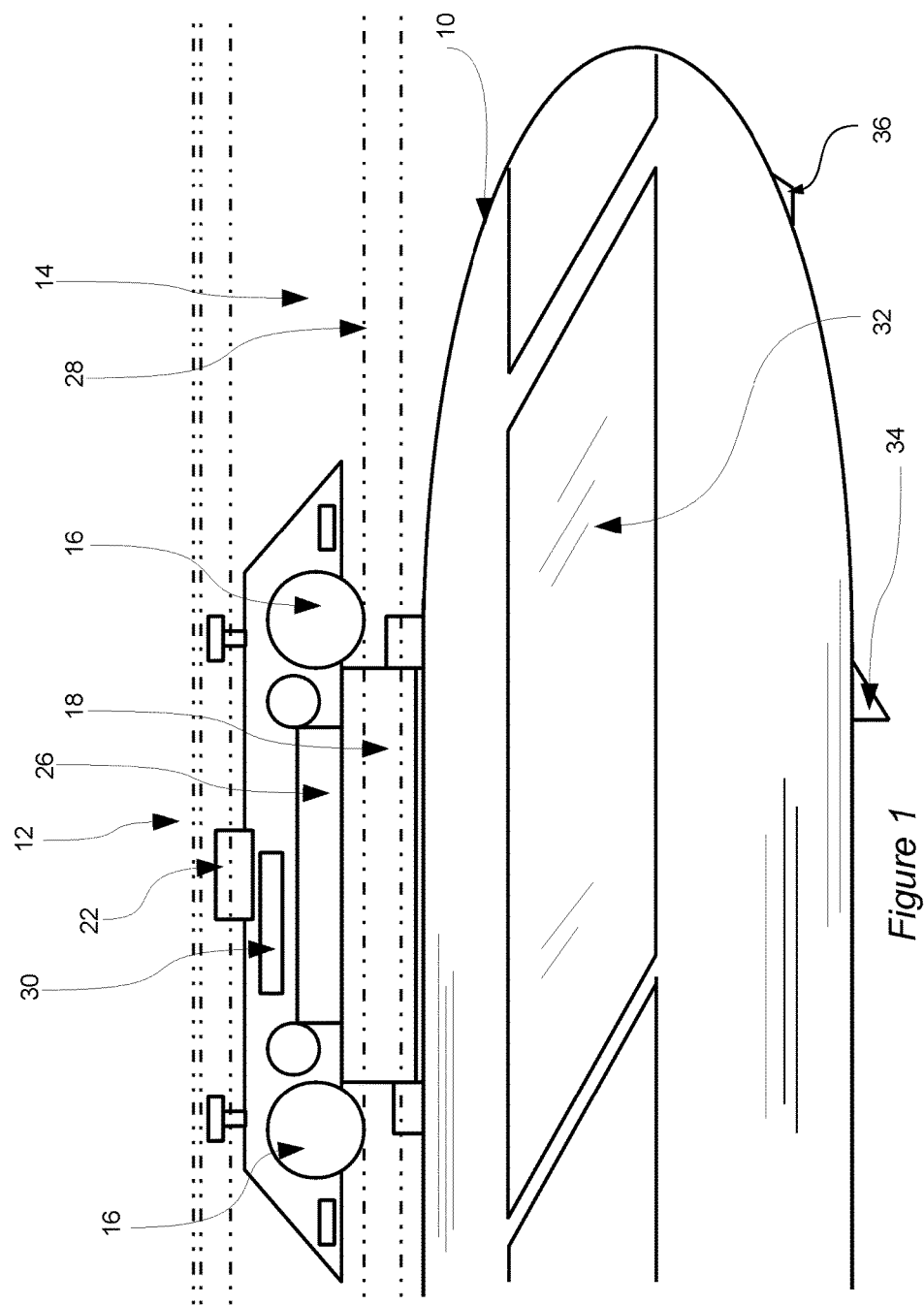
FIG. 1 is an illustration of a suspended coach system including a bogie inside of a guide way (shown in phantom) with a coach hanging beneath.
Figure 2:
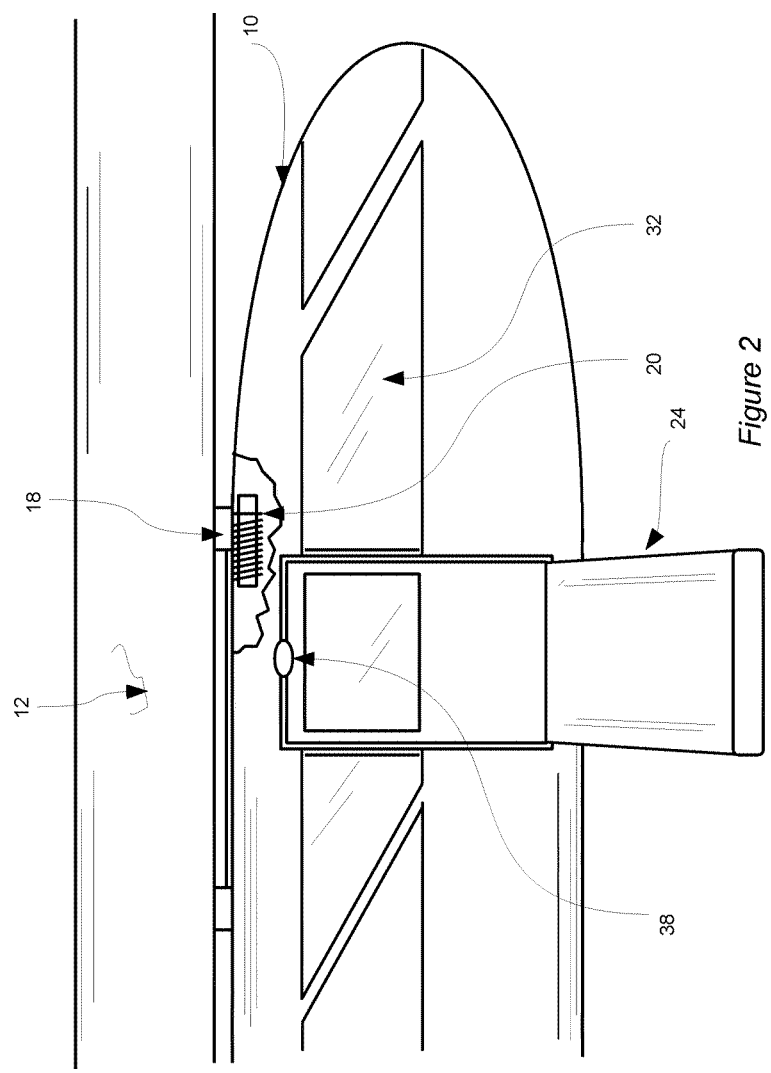
FIG. 2 is an illustration of evacuation methods which may be used by the passengers in case of a need to rapidly depart a coach.

With reference now to FIG. 1, the front end of a suspended passenger coach 10 attached to an automated, electrically-powered bogie 12 is shown. The bogie 12 incorporates onboard energy storage 26 and a digital processor 30. The coach 10 can be either large or small. A large coach 10 may incorporate two bogies 12 and a small coach 10 use only a single bogie 12. Although FIG. 1 and FIG. 2 illustrate coaches 10 designed to carry passengers, other or similarly shaped coaches 10 can be configured to carry cargo.

Operating commands are sent from a control center to the bogies 12. The commands are generated by software programs that can use the expected arrival times to determine the routes and velocities of the coaches 10 throughout the system.

The representative embodiment of the present invention illustrated incorporates a hinge 18 between the bogie 12 and the coach 10, which allows the coach 10 to swing as a means to maintain equilibrium between the force of gravity and centrifugal forces as the coach 10 travels along a curved section of a guide way 14. In cases where a single suspended coach 10 incorporates two bogies 12, the hinges 18 pivot longitudinally with the coach 10 as the coach 10 travels on a curved section of the guide way 14. This longitudinal pivoting of the hinges 18 with respect to the coach 10 is on the order of three to five degrees, allowing for a guide way 14 curvature radius of 40 meters. Tighter curvature radii can be achieved with a greater degree of pivoting between the hinge 18 and the coach 10.

Communications between the control center and the bogies 12 may utilize non-radio based technologies such as electrical conductors, fiber optics or any other form of fixed technologies, as the first leg. The communications connection between the fixed technologies and the moving bogies 12 incorporates a radio or other wireless technology, which may be implemented as a standard protocol or a custom protocol. An additional line of communications may use other technologies such as the wired internet and the wireless internet as may evolve at different locations over time. Communications can also take the form of power-line-communications (PLC) and use the power lines as the conduit for the transfer of commands and information.

In some cases the bogies 12 can relay commands and information throughout a network of bogies 12 and the control center. This may include pass-thru commands as well as actionable commands received by a bogie 12.

The communications between the bogies 12 are fed through a digital processor 30 to verify incoming commands and evaluate the commands based on data supplied by other elements or bogies 12 in the system as a means of ensuring cyber-security. The bogies 12 use the digital processors to compile and evaluate data supplied by other remote or geographically proximate bogies 12 as a means of operating the local system in a predetermined manner, or in cases of communications failure from the central controlling entity, to operate autonomously.

The suspended coach 10 is shaped and has such minimized protrusions as to achieve a very low aerodynamic drag for the primary purpose of maximizing energy efficiency and reducing aerodynamic noise. The coaches 10 are also shaped and have such aerodynamic control surfaces as a means to control sway movement of the coach 10 when ambient wind impacts the coach 10. An example of a reactive aerodynamic control surface is a rudder that is incorporated in the aft section of the coach 10 and swings to the leeward side of the coach 10 in reaction to a wind gust, such that the air pressure on the rudder pushes the coach 10 back into the wind. A second example of aerodynamic control surfaces may include fins 34 that pop out from the bottom of the coaches which could change orientation and extension length as required. Fins 34 located on the bottom of the coaches would have the greatest lever arm to stabilize the coach. A rudder and other aerodynamic control surfaces may be powered by the movement of the coach 10 through the air or by other power systems. The coaches 10 may also incorporate an electromechanical or mechanical means attached to the hinge 18 to control sway movement of the coach 10 when ambient wind impacts the coach 10. This active hinge 18 could use many of the components that are currently used on the active suspension systems of some cars.

The bogies 12 that operate in the fixed guide way 14 receive their electrical power through electrical conductors which run inside of the guide way 14. Electrical brushes or shoes 22 slide on the electrical conductors and thus, electrical power is transferred to the bogies 12. In some situations the electrical conductors are non-continuous at predetermined locations for the purpose of segmentation, or, isolation of different portions of the electrical grid. The energy storage 26 in the bogies 12 can function to supply the electrical power the pass over the un-powered portions of the guide ways 14.

In situations of steep grades or areas where rapid acceleration or deceleration is required the fixed guide way 14 incorporates high-friction or rough surfaces on those portions of the guide way 14 where the bogie's 12 traction wheels 16 will need extra friction.

Passengers on the suspended coaches 10 can be counted with the use of an inferred camera or other sensors 38 or means to infer the presence of passengers, and this data is used to verify mass loading and ticketing. Other sensors 36 and effectors may be implemented to turn a coach 10 into a platform for the execution of varying tasks such as snow measurements, atmospheric research and material extraction.

In cases of emergency the coaches 10 incorporate a speed governed support cable release mechanism 20 capable of lowering the coach 10 to the ground, or other surface, for rapid evacuation. The system incorporates a manual activation lever to be used by the passengers, or the cable release mechanism 20 can be activated via commands from the control center. An alternative emergency system which might be incorporated in the coaches 10 is an inflatable emergency evacuation slide 24 suitable for the evacuation of passengers should the need arise. This device may be made similar to the inflatable slides use on large commercial aircraft.

The coaches 10 can also incorporate transparent glazing 32 with the capabilities of automatically adjusting the glazing's 32 transmissivity of solar energy, as a means to lessen the internal heating of the coach 10 as may be desired. This technology can also be activated or de-activated by commands from the control center. In cold weather circumstances, the coaches 10 may incorporate radiant heating into the surfaces of the coach 10 to achieve a desired heating comfort effect on the passengers. In hot weather situations the radiant panels can also be cooled to increase passenger comfort. Since a common location for fires on board mass transit is the heating and air-conditioning equipment, the present invention advantageously contemplates apparatus to extinguish the fire or safely expel or drop a heating-ventilation-air-conditioning section of the coach 10 in case the section becomes a danger to the rest of the coach 10 possibly catching fire.

A service coach 10 can also be configured to provide services to other coaches 10, such as extending walkways to the other coaches 10 for passenger or parcel removal if the second coach 10 is disabled. In conjunction with the development and engineering of the coach 10 and bogie 12, Failure Mode and Effects Analysis may be used to increase the safety and reliability of the coaches 10 and bogies 12.

In operation, the bogies 12 are enabled to carry the coaches 10 by way of an attachment through the slot in the guide way 14. The bogie 12 uses the electrical energy storage 26 to capture the electrical energy gained during regenerative braking. This stored energy can then be used to help accelerate the bogies 12 and reduce demand on the electrical grid. Through the communications system employed, the bogies 12 can coordinate their electrical demand on the power grid and thus reduce the total power demand. Reduced power demand allows operation in accordance with the principles of Smart-Grid technology and keeps the overall cost of electricity lower.

Because the bogies 12 are complete propulsion units they can operate independently, in pairs or in groups. A single bogie 12 can carry a smaller coach 10, while two bogies 12 can be used to carry a large coach 10 as required. Either the smaller, single bogie 12 coach 10, or the larger, dual bogie 12 coach 10 can also be configured to carry cargo. The general outside dimensions of the passenger and cargo coaches 10 can preferably be the same to ensure compatibility with a system of coaches 10.

The coaches 10 are carried by the bogies 12, which receive their instructions from a control center. The programs at the control centers used to operate the system of coaches 10 are optimized to direct the coach 10 to its destination on the scheduled time. The bogies 12 can vary their velocities throughout their runs in order to meet their required arrival times. This is one of the benefits of using suspended coaches 10 in higher speed situations than those of earlier incarnations of this mode of transportation. By virtue of the coaches 10 swinging out while rounding a curved section of guide way 14 the passengers are not discomforted regardless of the velocity at which the curve is taken. The hinge 18 between the bogie 12 and the coach 10 allows the coach 10 to swing as a method to maintain equilibrium between the force of gravity and the centrifugal forces as the coach 10 travels around the curved section of the guide way 14. In cases where a single suspended coach 10 incorporates two bogies 12, the hinges 18 are enabled to pivot longitudinally with the coach 10 as the coach 10 travels while on the curved section of the guide way 14. This longitudinal pivoting of the hinges 18 with respect to the coach 10 allows the coach 10 to round the curve and swing out on the curve at the same time, without binding. Tighter curvature radii can be achieved with a greater degree of pivoting between the hinge 18 and the coach 10.

Commands and information may be transmitted between the control center and the bogies 12 by non-radio technologies such as electrical conductors, fiber optics or any other form of fixed technologies, as the first leg. The communications connection between the fixed technologies and the moving bogies 12 incorporates a radio or other wireless technology, which may be a standard protocol or a custom protocol. An additional line of communications may use other technologies such as the wired internet and the wireless internet as may evolve at different locations over time. Communications can also take the form of power-line-communications (PLC) and use the power lines as the conduit for the transfer of commands and information.

In some cases the bogies 12 may relay commands and information throughout a network of bogies 12 and the control center. This may include pass-thru commands as well as actionable commands received by a bogie 12.

The communications between the bogies 12 are fed through a digital processor 30 to verify incoming commands and evaluate the commands based on data supplied by other system elements or bogies 12 in the system as a means of ensuring cyber-security. The bogies 12 use the digital processors to compile and evaluate data supplied by other remote or geographically proximate bogies 12 as a way of operating the local system in a predetermined manner, or in cases of communications failure from a central controlling entity, to operate autonomously.

While the suspended coach 10 is shaped to achieve a very low aerodynamic drag for the purpose of maximizing the energy efficiency and aerodynamic noise reduction, the coaches 10 may also incorporate aerodynamic control surfaces to control the sway of the coach 10 when it is buffeted by the wind or pressure fronts from converging coaches, especially at high speeds. When an incorporated rudder is hit by a side wind it is pushed leeward and into the airstream caused by the forward movement of the coach 10. The apparent wind from the forward movement of the coach 10 pushes against the rudder applying a force to bring the coach 10 back into gravitational equilibrium. If the side wind force is not strong enough to force the rudder into the forward movement airstream then an electromechanical servo for moving the rudder may be employed. An alternative, or enhancement, to the rudder is the use of aerodynamic control fins 34, which may be selectively deployed from the bottom of the coach as required. The orientation and amount of protrusion of the fins 34 can be adjusted within fractions of a second to provide the forces needed to counteract the side wind loading. Fins 34 located on the bottom of the coaches should offer the greatest amount of leverage to stabilize the coaches hit by cross winds or pressure fronts from oncoming coaches. The coaches 10 may also incorporate an electromechanical, or mechanical, means attached to the hinge 18 to control sway movement of the coach 10 when ambient wind impacts the coach 10. A coordination sensor can be employed to measure the gravitational vector and compare it to any centrifugal vector to determine the balanced equilibrium for the coach 10 and then signal the electromechanical servo on the hinge 18 to move to a balanced position.

As the guide ways 14 are built out into arterial routes and networks, the need may arise to segment portions of the electrical network. This could be required as a means to monitor electrical energy usage by the system or the need to balance loads within the grid. In these situations the bogie 12 might need to operate without any connections to the electrical power grid for a short period of time. The energy storage 26 in the bogies 12 can then supply the electrical power to pass over the un-powered portions of the guide ways 14. The energy storage 26 will also be used when the electrical power grid connection fails.

In situations of steep grades or areas where rapid acceleration or deceleration are required the fixed guide way 14 incorporates high-friction or rough surfaces on those portions of the guide way 14 where the bogie's 12 traction wheels 16 might require extra friction. The high-friction surfaces within the guide way 14 can also be used where ambient atmospheric conditions create low-friction conditions on a regular basis. With the greater friction afforded on these high-friction surfaces, the bogies 12 will then be able to accelerate or brake at a greater rate than a location without the added friction.

Passengers on the suspended coaches 10 can be counted with the use of an infrared camera, sensor 38 or other means for inferring the presence of passengers and this data can then be used to verify mass loading and ticketing. The same data can also be used by the on-board digital process in calculating power demands and traction requirements as the bogie 12 carries the loaded coach 10 on inclines or slippery track 28 sections. As may be required by the suspended coach 10 operating entity, the passenger counting technology may be used to ensure all of the passengers paid for the ride.

Sensors 36 and effectors can be used to turn a coach 10 into a platform for the execution of varying tasks such as snow measurements, atmospheric research and material extraction. These sensors can either be placed on a dedicated coach 10 or added on to a passenger or cargo coach 10. The gathered data is sent to the control center or directly to an acquirer of the data as a means to generate additional revenue for the system owner.

In cases of emergency, the coaches 10 incorporate a speed governed support cable release mechanism 20 capable of lowering the coach 10 to the ground, or other surface, in case a need for rapid evacuation should arise. A manual activation lever may be operated by a passenger, or the cable release mechanism 20 may be activated via commands from the control center. Mechanical safeguards can be incorporated in the guide way 14 to eliminate the possibility of lowering the coach 10 into a more perilous situation such as might be encountered in a river or alligator swamp. In inhospitable locations, a walkway may be built below the guide way similarly to the type used by conventional sit-on-top APMs.

An alternative emergency system incorporated in the coaches 10 may comprise an inflatable emergency evacuation slide 24 suitable for the evacuation of passengers, should the need arise. This device may be made similar to the inflatable slides used on large commercial aircraft. This device can, alternatively, be activated by a passenger or the control center. The choice of either a lowering of the coach 10 or the inflatable slide 24 can be made based on the particular physical location of the coach, as some locations may be more suited to lowering the coach 10 while others are more suited to the inflatable slide. The length of the cables can also be determined to fit the geographical locations.

The coaches 10 can also incorporate transparent glazing with the capabilities of automatically adjusting the glazing's 32 transmissivity of solar energy, as a means to lessen the interior heating of the coach 10 as may be desirable. The technology can also be activated or de-activated by commands from the control center. High levels of solar energy transmissivity is a benefit to coach 10 passengers in the temperate and Arctic zones, especially in the winter months. Conversely, the benefit of reducing the solar energy transmissivity during warmer periods can greatly reduce the overall energy demand of the coaches 10.

In cold weather situations the coaches 10 may incorporate radiant heating into the surfaces of the coach 10 to achieve a desired heating comfort effect on the passengers. Radiant heating of people has been shown to have a far greater effect on one's comfort than warming the air. Additionally, heated air is quickly lost when the doors are opened and the passengers are moving in and out. Radiant heat does not suffer from that same shortcoming. Although radiant cooling is rare, it can be incorporated in the coaches as a means of reducing energy consumption while concomitantly increasing passenger comfort.

Since a common location for fires on board mass transit vehicles is the heating and air-conditioning equipment, the present invention advantageously discloses the capability to safely expel or drop a heating-ventilation-air-conditioning section of the coach 10 in case the section becomes a danger to the rest of the coach 10 by catching fire. This is only an option in locations that the dropping of the HVAC equipment does not create a hazard itself.

A service coach 10 provides services to other coaches 10, such as extending walkways to the other coaches 10 for passenger or parcel removal if the second coach 10 is disabled. This may be most easily accomplished when the coaches 10 are on parallel guide ways 14 as will be common on arterial installations. The service coach 10 can be directed to park directly across from the disabled coach 10 and a ramp installed between the two doors of the coaches 10. People and passengers can then be transferred from one coach 10 to the other.

Throughout the development and engineering of the coach 10 and bogie 12 Failure Mode and Effects Analysis may be used to increase the safety and reliability of the coaches 10 and bogies 12. Application of this process will ensure that a better system is constructed from the first pre-production of products. It should be noted that, in lieu of a wheeled design, the present invention may also be conveniently provided as a magnetic levitation (maglev) system either in whole or in part.

In conclusion, the principles of the present invention disclosed herein comprise a collection of improvements and enhancements that can be applied to hanging monorails, hanging trains, or suspended coach automated people movers. In this manner, the present invention can advantageously provide transit system products that are faster, safer, more energy efficient, more reliable, and more useful than the prior art.

While there have been described above the principles of the present invention in conjunction with specific apparatus it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

As used herein, the terms "comprises", "comprising", or any other variation thereof, are intended to cover a non-exclusive inclusion, such that a process, method, article, or apparatus that comprises a recitation of certain elements does not necessarily include only those elements but may include other elements not expressly recited or inherent to such process, method, article or apparatus. None of the description in the present application should be read as implying that any particular element, step, or function is an essential element which must be included in the claim scope and THE SCOPE OF THE PATENTED SUBJECT MATTER IS DEFINED ONLY BY THE CLAIMS AS ALLOWED. Moreover, none of the appended claims are intended to invoke paragraph six of 35 U.S.C. Sect. 112 unless the exact phrase "means for" is employed and is followed by a participle.

What is claimed is:

1. A suspended coach comprising:
   at least one automated, electrically powered drive bogie;
   a coach attached to and suspended from the drive bogie;
   a hinge interconnecting the coach and the at least one drive bogie, the hinge enabling the coach to maintain equilibrium between the force of gravity and centrifugal forces encountered as the coach travels around curved portions of a guide way;
   a digital processor that operates the bogie; and
   a speed governed support cable release mechanism coupled between the drive bogie and the coach, the mechanism configured to selectively effectuate lowering of the coach in case of a need for rapid evacuation of the coach.

2. The suspended coach of claim 1 wherein said coach is of a first size and is transported by a single one of said bogies, or is of a second larger size and is transported by two of said bogies.

3. The suspended coach of claim 1 further comprising:
   an inflatable evacuation slide configured for evacuation of passengers of said coach in case of a need for rapid evacuation of said coach.

4. The suspended coach of claim 1 wherein said coach further comprises:
   transparent glazing configured for automatically adjusting a transmissivity thereof to solar energy to selectively lessen internal heating of said coach.

5. The suspended coach of claim 1 wherein said coach further comprises:
   at least one of a radiant heating or cooling system for selected surfaces of said coach.

6. The suspended coach of claim 1, wherein the digital processor operates the bogie based on expected arrival times from which routes and velocities are determined.

* * * * *